UNITED STATES PATENT OFFICE.

DARWIN SMITH, OF DES MOINES, IOWA.

INSECTICIDE.

SPECIFICATION forming part of Letters Patent No. 490,688, dated January 31, 1893.

Application filed November 17, 1892. Serial No. 452,241. (No specimens.)

*To all whom it may concern:*

Be it known that I, DARWIN SMITH, a citizen of the United States, residing at Des Moines, in the county of Polk and State of Iowa, have invented new and useful Improvements in a Composition for Insect-Exterminators, of which the following is a specification.

My composition consists in the following ingredients combined in about the proportions stated, viz., one hundred (100) pounds of powdered borax, and thirty pounds of powdered colocynth, the whole to be thoroughly mixed by any well known method, such as passing through several sieves &c. It is preferable to add a small quantity of coloring matter, although this is not essential. I prefer to employ as a coloring matter yellow ocher in the proportions of ten (10) pounds of the yellow ocher to the quantities of borax and colocynth as above set forth; but other coloring matter may be employed in proportions depending upon its character and weight.

My composition is especially useful as an insect destroyer and is particularly destructive of cockroaches and vermin of similar character. In its use it is scattered or blown by pipes or other similar means into the crevices and around the localites inhabited by the vermin, and portions of the powder become attached to the bodies of the insects and are drawn into their breathing pores and scales, as they pass over or through it, whereby their immediate death is occasioned.

Having thus described my invention what I claim as new and desire to secure by Letters Patent of the United States, is as follows:—

1. The hereinbefore described composition of matter consisting of borax and colocynth in the quantities and proportions specified, thoroughly mixed together; all substantially as described.

2. The hereinbefore described composition of matter consisting of borax, colocynth and yellow ocher, all thoroughly mixed in the proportions specified; all substantially as shown.

In witness whereof I have hereunto set my hand in the presence of two witnesses.

DARWIN SMITH.

In presence of—
  J. LAWRENCE GERRY,
  HILLES T. BROWN.